April 10, 1934.  F. HANEL  1,954,409
ANTISKID DEVICE FOR MOTOR VEHICLES
Filed Nov. 1, 1933
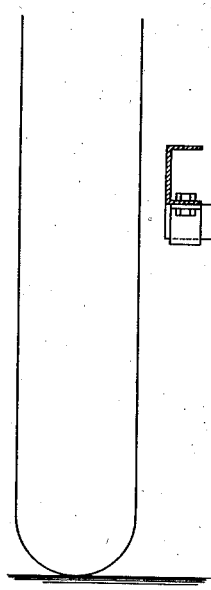
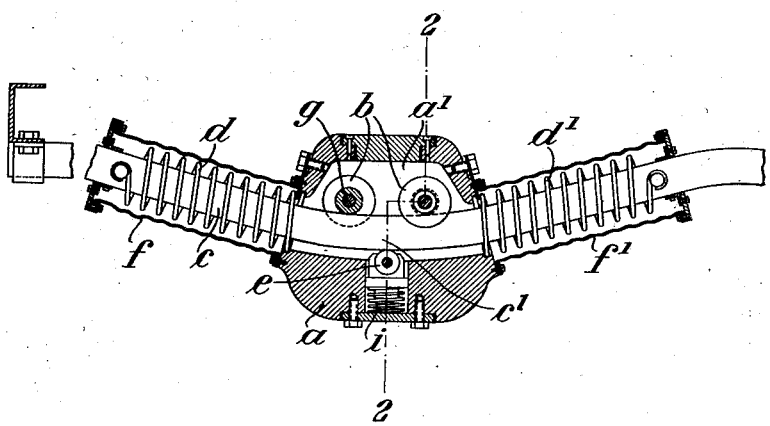
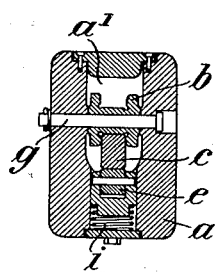
Inventor:
Franz Hanel.

Patented Apr. 10, 1934

1,954,409

UNITED STATES PATENT OFFICE 1,954,409

ANTISKID DEVICE FOR MOTOR VEHICLES

Franz Hanel, Berlin-Schlachtensee, Germany, assignor to Permo Corporation, Vaduz, Liechtenstein Application November 1, 1933, Serial No. 696,223
In Germany July 11, 1932

5 Claims. (Cl. 280—150)

This invention relates to an anti-skid device for motor vehicles and consists in the provision of a weight suspended from a substantially V-shaped carrier mounted at the rear part of the chassis in a plane parallel to the rear axle and with downwardly directed apex located vertically under the central longitudinal axis of the vehicle, the weight being adapted to travel by inertia along the carrier in either direction from its normal position at the apex. Springs are provided for checking the movement of the weight in both directions, and the springs are enclosed in flexible dust excluding jackets which also form a closure for the aperture whereby the weight is mounted on the carrier.

The springs, which maintain the weight normally in a central position at the apex of the carrier, are each connected at one end to the latter and at the other end to the weight so that the movement of the weight will be checked by both springs simultaneously, one spring being compressed and the other tensioned when the spring moves. The weight tends to increase the adhesion of the driving wheels to the road surface and will, by its inertia aided by the springs, oppose any skidding movement of the vehicle. If the latter should commence to skid on a wet road or at a bend, the weight will be displaced on the carrier by inertia, and the power required for displacing the weight in an upwardly inclined path and in opposition to the springs, will counteract the oppositely directed force under the influence of which the skidding takes place. Thus the skidding will be opposed and checked right from the commencement.

Since the weight is carried in a relatively low position, it will act with considerable leverage on the vehicle in balancing the latter when taking curves, a fact which will inspire the driver with greater confidence.

Fig. 1 of the accompanying drawing represents a sectional side view of a device constructed according to the invention, and Fig. 2 is a section on the line 2—2 of Fig. 1.

Mounted on the rear part of the chassis frame in a plane parallel to the rear axle of the vehicle, is a substantially V-shaped carrier $c$ intended for the reception of a slidable weight $a$. The latter has an aperture $a^1$ whereby it is threaded on the carrier, it being suspended on the latter through the medium of an anti-friction roller $b$ mounted on a shaft $g$. The downwardly directed apex $c^1$ of the carrier is located vertically under the central longitudinal axis of the vehicle where, owing to the inclination of the carrier arms, the weight will be normally maintained. The retention of the weight in its normal position is further ensured by means of two identical coil springs $d$ and $d^1$ arranged on the carrier one at each side of the weight. Each spring is connected at one end to the carrier and at the other end to the weight so that a displacement of the weight on the carrier will be opposed simultaneously by both springs, one being compressed and the other tensioned. Such a displacement only takes place owing to the inertia of the weight if the vehicle should skid, and the skidding movement will thus be opposed by the weight.

To prevent vibratory movements of the weight on the carrier, a pair of anti-friction rollers $e$ are arranged in the weight aperture $a^1$ for engagement with the under surface of the carrier. Each roller $e$ is mounted in a plunger which is arranged to slide in a recess $i$ in the weight and supported by a spring.

In order to protect the springs and the different guide elements from dust and the like, flexible jackets $f$, $f^1$, made of leather, metal or the like, are provided which enclose the springs, each jacket being connected at one end to the carrier $c$ and at the other end to the weight $a$ so as to close the aperture $a^1$ and form dustproof joints.

The carrier $c$ is made of drawn iron and may be of square or any other suitable cross-section. The rollers $b$ and $e$ are made of red bronze metal and provided with polished bearing surfaces.

I claim:

1. An anti-skid device for motor vehicles comprising a substantially V-shaped carrier mounted at the rear part of the chassis in a plane parallel to the rear axle and with downwardly directed apex located vertically under the central longitudinal axis of the vehicle, and a weight suspended from and adapted to travel by inertia along the carrier in either direction from the apex.

2. The structure claimed in claim 1 in combination with springs tending to maintain the weight at the apex of the carrier.

3. The structure claimed in claim 1 in combination with two coil springs threaded on the carrier at opposite sides of the weight for maintaining the latter normally at the apex of the carrier, each spring being secured at one end to the weight and at the other end to the carrier.

4. The structure claimed in claim 1 in combination with anti-friction rollers mounted in the weight and adapted to guide the latter on the carrier.

5. An anti-skid device for motor vehicles comprising a substantially V-shaped carrier mounted at the rear part of the chassis in a plane parallel to the rear axle and with downwardly directed apex located vertically under the central longitudinal axis of the vehicle, a weight having an aperture by means of which it is mounted on said carrier, anti-friction rollers mounted within the aperture of the weight for guiding the latter slidably on the carrier, coil springs mounted on the carrier one at each side of the weight for maintaining the latter normally at the apex of the carrier, each spring having one end secured to the weight and the other end to the carrier, and a flexible dust excluding jacket enclosing each spring and forming a tight closure at one end with the carrier and at the other end with the weight.

FRANZ HANEL.